UNITED STATES PATENT OFFICE.

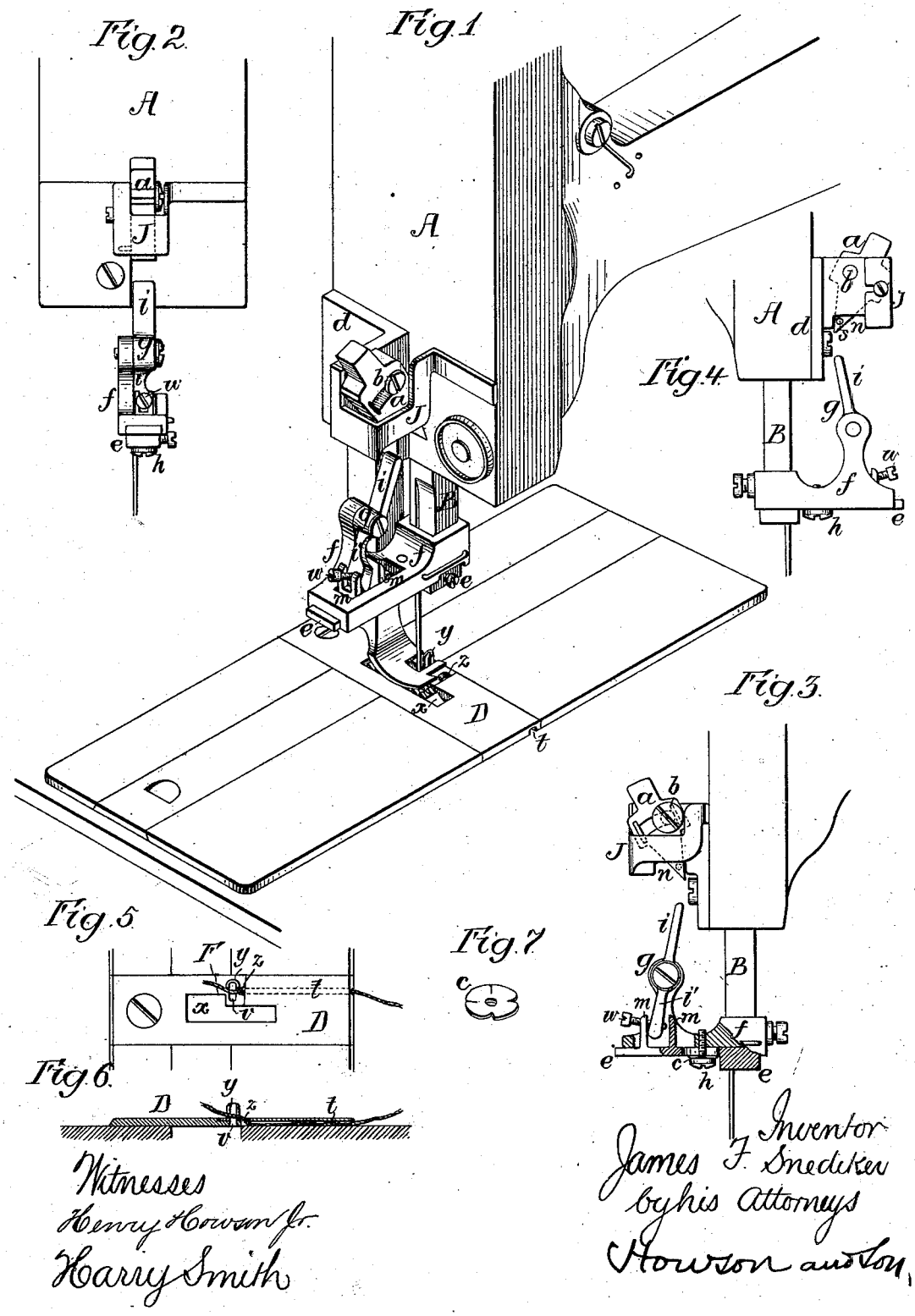

JAMES F. SNEDIKER, OF PHILADELPHIA, PA., ASSIGNOR TO THE NATIONAL SEWING MACHINE COMPANY, (LIMITED,) OF SAME PLACE.

IMPROVEMENT IN BUTTON-HOLE ATTACHMENTS FOR SEWING-MACHINES.

Specification forming part of Letters Patent No. 222,089, dated November 25, 1879; application filed June 19, 1879.

*To all whom it may concern:*

Be it known that I, JAMES F. SNEDIKER, of Philadelphia, Pennsylvania, have invented a new and useful Improvement in Sewing-Machine Attachments, of which the following is a specification.

My invention relates to certain improvements in that class of sewing-machine attachments in which a needle-carrying slide on the needle-bar is combined with a lever and a reversible tappet or dog, whereby the needle is shifted laterally on the vertical reciprocation of the needle-bar, the objects of my invention being to prevent the tappet or dog from being entangled with the thread, to regulate the movement of said tappet or dog and of the slide, and to provide for the convenient introduction of a cord in the sewing of button-holes.

These objects I attain in the manner which I will now proceed to describe, reference being had to the accompanying drawings, in which—

Figure 1 is a perspective view of the head and part of the bed-plate of a sewing-machine with my improved attachment; Fig. 2, a front view; Fig. 3, a side view, partly in section; Fig. 4, a rear view of Fig. 3; Fig. 5, a plan view of a portion of the bed; Fig. 6, a sectional view of the same; and Fig. 7, an enlarged perspective view of part of Fig. 3.

In the present instance I have shown my invention in connection with a sewing-machine attachment embodying the mechanical movement for which Letters Patent of the United States No. 211,600 were granted to my assignees on the 21st day of January, 1879, $a$ being the slotted dog, hung by a pin, $b$, to a block, $d$, on the head A of the machine; $e$, the needle-carrying slide adapted to a block, $f$, secured to the lower end of the needle-bar B; and $g$, a lever hung to a stud on the block $f$, and having one arm, $i$, for acting on and being acted on by the dog $a$, and another arm, $i'$, the lower end of which fits loosely between lugs $m$ $m$, formed on the back of the slide $e$.

The manner in which the slide is vibrated by the action of the lever $g$ and dog $a$ on each vertical reciprocation of the needle-bar is fully described in the specification of the aforesaid patent for mechanical movement, and need not be dwelt upon here.

The slide $e$ is slotted, and to this slot is adapted the stem of a screw, $h$, which is adapted to a threaded opening in the block $f$. Between the head of this screw and the under face of the slide $e$ intervenes a spring-washer, $c$, Fig. 7, the device thus affording a simple means of guiding the slide and retaining the same at each end of its movement.

The block $d$, to which the dog $a$ is hung, has a slot, $n$, formed in its lower edge, and to this slot is adapted a pin, $s$, which projects rearwardly from the point of the dog, this pin coming into contact with the opposite ends of the slot $n$ as the dog is vibrated, and thereby arresting the movement of the dog and insuring the maintenance of the point of the same in position for properly acting on the upper end of the arm $i$ of the lever $g$ as the latter rises.

Secured to the outer end of the block $d$ is a plate, J, of sheet metal, which is bent at right angles, so as to partially inclose the dog $a$ and serve as a guard for preventing the thread from becoming entangled with said dog and interfering with its operation.

One of the lugs $m$ on the needle-carrying slide $e$ is slotted, as shown in Figs. 1 and 2, for the reception of the stem of a set-screw, $w$, which is carried by the arm $i'$ of the lever $g$. By the adjustment of this set-screw the extent of the lost motion of the lower end of the arm $i'$ between the lugs $m$ may be regulated, and the extent of reciprocation of the slide $e$ thereby governed.

Instead of being carried by the arm $i'$ of the lever, the set-screw $w$ may be carried by one or other of the lugs $m$, if desired, the result in this case being the same, and the slotting of one of the lugs being unnecessary.

D is the ordinary throat-plate, having a slot, $x$, for the reception of the notched feed-plate. In this plate D is formed a recess with beveled edges, to which are adapted the edges of a plate, F, having an elongated slot, $v$, and a short semi-tubular vertical projection, $y$, at one end of said slot. This block is inserted into place when it is desired to work a button-hole, the projection $y$ being adapted to the incision in the cloth in a manner common in button-hole-working machines.

In working button-holes it is desirable to introduce a cord around the edge of the opening for the purpose of strength; and in order to provide for the ready introduction of this cord from the front of the table I form in the under side of the plate D a groove, $t$, said groove terminating at an opening $z$, in the plate F. The cord is passed through the groove $t$ and up through the opening $z$, so that it lies across the slot $v$ in the plate F, directly in front of the projection $y$, as shown in Fig. 5, the needle in sewing entering the slot first on one side of the cord and then on the other, so that the stitches are formed around the cord and the latter is firmly secured to the edge of the button-hole.

When it is desired to do plain sewing or ordinary cross-stitch sewing, the plate F is removed and a plain slotted plate substituted therefor. The groove $t$ may, if desired, be used in connection with a throat-plate having also the slot $v$, projection $y$, and opening $z$, instead of the latter being formed in a separate plate.

Although I have described my improvements as applied to a sewing-machine attachment embodying my patented mechanical movement, the said improvements are not limited thereto, but may be applied to any sewing-machine attachment in which are combined the needle-carrying slide, the lever, and a reversible tappet or dog.

I claim as my invention—

1. The combination of the block $d$, the reversible tappet or dog $a$, and the guard-plate J, all substantially as specified.

2. The combination of the block $f$, the slide $e$, having lugs $m\ m$, the lever $g$, and the set-screw $w$, all substantially as described.

3. The throat-plate D, having a slot, $x$, groove $t$, slot $v$, projection $y$, and opening $z$, all as specified.

In testimony whereof I have signed my name to this specification in the presence of two subscribing witnesses.

JAMES F. SNEDIKER.

Witnesses:
    WILLIAM J. COOPER,
    HARRY SMITH.